April 24, 1962   J. L. SAFFER ET AL   3,031,225
TAILGATE MOUNTING

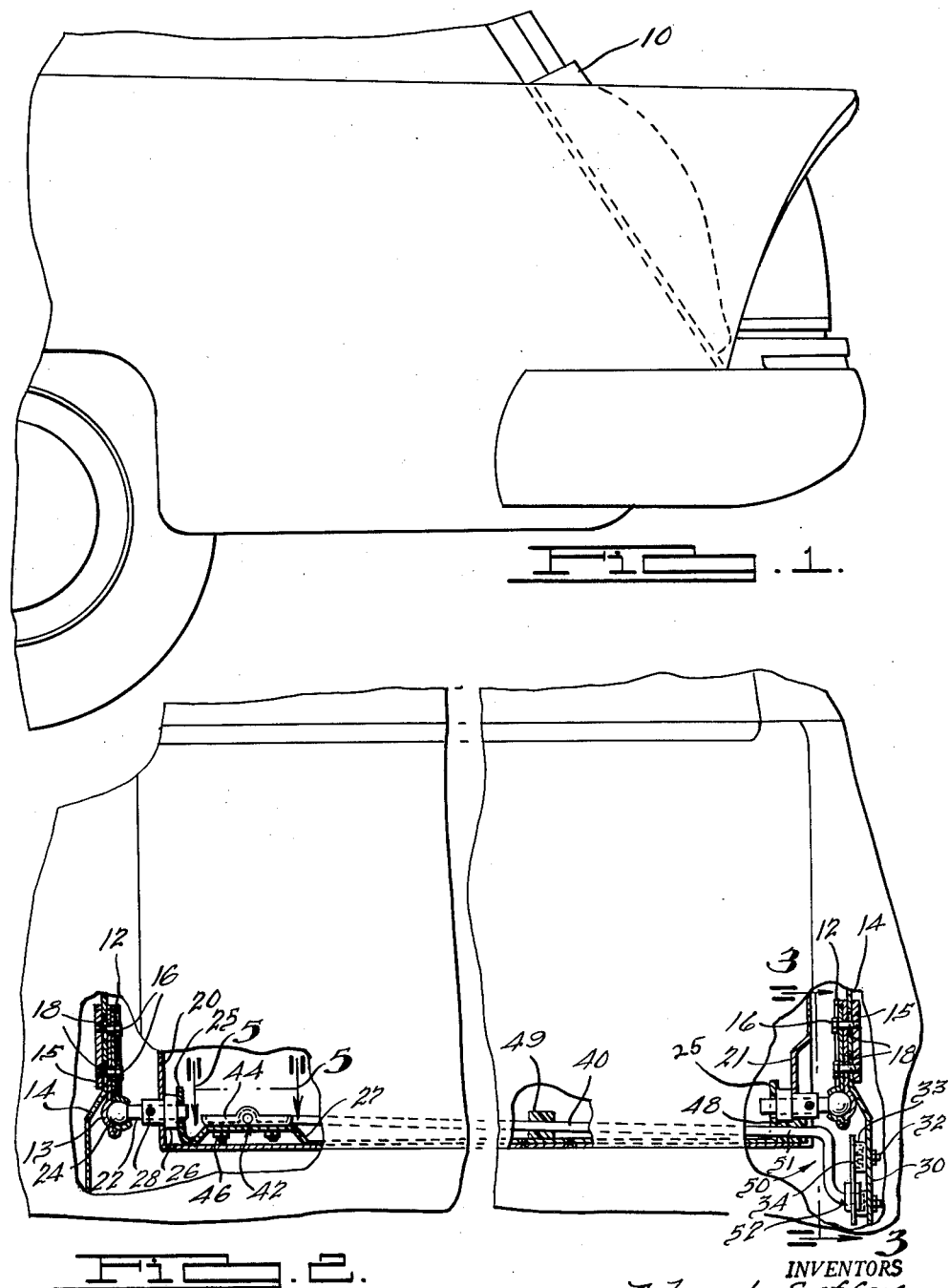

Filed Feb. 11, 1959   2 Sheets-Sheet 2

INVENTORS.
John L. Saffer and
Donald W. Soltman

BY Harness and Harris
ATTORNEYS.

United States Patent Office 3,031,225
Patented Apr. 24, 1962

3,031,225
TAILGATE MOUNTING
John L. Saffer, Madison Heights, and Donald W. Soltman, Livonia, Mich., assignors to Chrysler Corporation, Highland Park, Mich., a corporation of Delaware
Filed Feb. 11, 1959, Ser. No. 792,642
3 Claims. (Cl. 296—57)

This invention relates to hinging and torsion reaction suspension systems for tailgates and the like.

In conventional tailgate suspension systems as used on automotive vehicles an undesirable operating characteristic exists, that is, the force required to move the tailgate through its range of pivotal movement and in particular to its fully closed and fully opened positions is not uniform and is very often excessive when the person operating the tailgate possesses limited strength. A portion of this excessive force required may be the result of the use of torsion type suspensions which progressively build up torque opposing movement of the tailgate from one limit of its movement to the other.

Another problem frequently associated with such torsion type systems is that excessive torsion buildup therein may cause the tailgate to inopportunely slam shut or spring open and may necessitate the use of latches or other devices to secure the gate against such movement.

It is a principal object, therefore, to provide a tailgate hinging and torsion bar suspension system which will obviate the aforementioned problems.

In the present invention, the door or tailgate is provided at both ends with a ball and socket type of hinge joint having its horizontal axis running through the sides of the conveyance adjacent the ends of the tailgate to provide a pivotal axis therefor. These joints are adjustable horizontally and longitudinally of the pivotal axis of the door so as to properly position the door in its opening in the rear of the vehicle. A torsion bar having its longitudinal axis offset from the pivotal axis of the door has one end secured to the door adjacent one side thereof and the other end extending through an aperture in the other side of the door. This other end of the torsion bar is offset laterally from the longitudinal axis thereof and is inserted and movably secured in a slot in one side of the vehicle in which slot said end is allowed to ride to compensate for the arc defined by the torsion bar as it moves in response to the movement of the car door about its pivotal axis. This arc is caused by the offset of the longitudinal axis of the torsion bar from the pivotal axis of the door. The slot in which the end of the torsion bar rides is designed to adjust the length of the moment arm of the torsion bar in accordance with various positions of the tailgate to compensate for the weight moment thereof.

A further object of this invention is to provide the tailgate of a vehicle with a readily adjustable hinge mounting and a torsion bar type of suspension which torsion bar has a non-stressed position corresponding to a partially open position of the tailgate so as to allow the gate in being closed to resist movement from said non-stressed position to its closed position and to resist movement to its wide open position from said non-stressed position.

A further object of this invention is to provide a novel type of torsion bar suspension having an adjustable force moment for the tailgate of an automotive conveyance so as to regulate the closing and opening force exerted on the tailgate by the torsion bar throughout the range of movement thereof.

A further object is to provide an adjustable hinge mounting for an automotive tailgate having a torsion bar spring mechanism.

A specific object is to provide a suspension for a tailgate which prevents said gate from slamming shut or open in response to normal closing or opening pressure being applied thereto.

Further objects and advantages of the present invention will become apparent from the following description and drawings, in which:

FIGURE 1 represents a side view of the rear end of an automobile showing the relative positioning thereon of the tailgate;

FIGURE 2 represents an end view partly broken away of the automobile of FIGURE 1 showing the outer surface of the tailgate and the structure of the adjustable tailgate hinge mounting and torsion bar arrangement;

Figure 6:
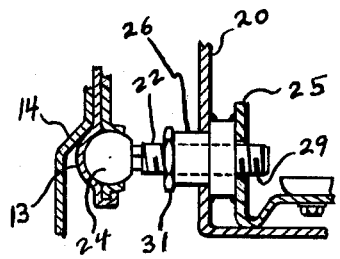
FIGURE 6 represents a variation of the ball and socket hinge.
Figure 3:
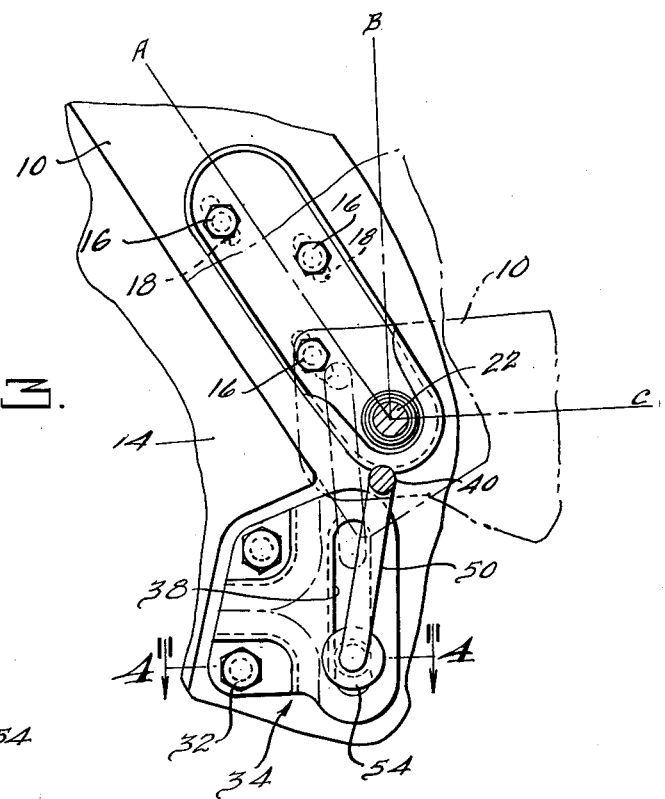
FIGURE 3 represents a cross sectional view taken along the line 3—3 of FIGURE 2 in the direction of the arrows.
Figure 4:
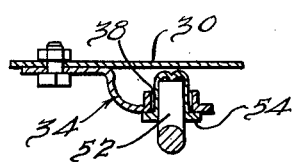
FIGURE 4 represents a view through the end of the torsion bar of FIGURE 3 taken along the line 4—4 thereof in the direction of the arrows.
Figure 5:
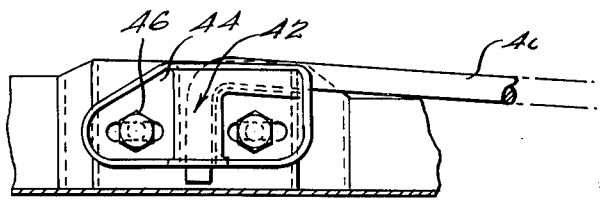
FIGURE 5 represents a view of the stationary end of the torsion bar of FIGURE 2 taken along the line 5—5 thereof in the direction of the arrows.

Referring to the drawings, a tailgate 10 of an automobile is shown in its closed position corresponding to the line A of FIGURE 3. This tailgate 10 is provided at each end with a ball and socket type of hinge mounting shown specifically in FIGURE 2 and comprising socket flanges 12 vertically adjustably secured to the side pillars 14 of the automobile by bolts 16 which extend through slots 18 in pillars 14 and are threadably received in securing plates 15. This adjustment of the socket flanges enables one to properly position the tailgate vertically within the tailgate opening of the vehicle. Secured to each of the ends 20 and 21 of the tailgate is a stud 22 either smooth as shown in FIGURE 2 or threaded at 29 as shown in FIGURE 6 and which is integral with a ball 24 rotatably received in each of the sockets 13 of the socket flanges 12. Each stud 22 slidably receives a lock collet 26 which is rigidly secured to each end of the door and to the adjacent flanges 25 of the door rigidifying member 27 which is secured to the door bottom by suitable means such as welding. Collets 26 are adjustable longitudinally of the studs 22 to properly position the tailgate within its opening in the vehicle body. Set screws 28 as shown in FIGURE 2, or lock nuts 31 threaded onto threads 29 as shown in FIGURE 6 immovably secure collets 26 to studs 22 when the proper adjustment of the tailgate in its opening is made.

One of the pillars 14 of the vehicle has secured thereto by stud means 32 and spacer means 33 a depending flange 34. As shown in FIGURE 3, this depending flange 34 is provided with a slot 38 the longitudinal axis of which is substantially vertical to the automotive vehicle. The slot 38, however, may be curved or be at an angle with respect to the vertical axis of the vehicle depending upon the particular torsion required from the torsion bar throughout the range of movement of the door, as will be described below.

A torsion bar 40 is secured at one end 42 to the rigidifying member 27 at the bottom of the door 10 by suitable flange means 44 and studs 46. The other end 50 of torsion bar 40 is journaled in a plastic grommet 48 in one end of the door and curves away from the longitudinal axis of the bar to provide a cam follower portion 52. Other plastic means such as 49 may be provided to offer additional support for the bar.

Portion 52 of the torsion bar is provided with a cam following bearing means 54 in the form of a cap which is rotatable on portion 52 of the bar and the edge or cam portions of slot 38. It is seen that the longitudinal axis of the torsion bar 40 is offset from the pivotal axis of the door and will move in an arc as the door rotates about its pivotal axis. In order to utilize the reaction force of the door developed by force exerted on the end 52 of the torsion bar tending to move portion 51 of the bar against the grommet 48, this grommet is positioned with respect to the pivotal axis of the door so as to create a force moment when such reaction force occurs which moment will tend to aid the torsion developed by the bar in pivoting the door about its axis.

Torsion bar 40 is pre-stressed, or it may be said has a non-stressed position when the door is in the partially opened position corresponding to line B of FIGURE 3. It is not until the door is moved toward either line A or line C which represent the door in its fully closed and fully opened positions respectively that the torsion bar develops a tension tending to resist movement of the door in either of these directions.

It is readily seen that as the door is pivoted about its axis the cam follower portion 52 of the bar will move in slot 38 to thereby adjust the moment arm length of the torsion bar and the torque moment developed thereby. This adjustment has been found to be very desirable as a means to prevent the torsion moment of the bar from building up to an excessive degree as the tailgate is moved from its neutral position B to either the closed or open positions represented by lines A and C in FIGURE 3.

By varying the shape of the cam edges of the slot 38 the proper length can be given to the moment arm of the bar to compensate for the weight moment of the tailgate and establish thereby a uniform force required to move the tailgate in either direction from its neutral position B.

We claim:

1. In an automotive vehicle body having rear side portions defining a rear tailgate opening, a tailgate positioned in said opening, said gate having end portions adjacent said side portions, hinge means on said side portions cooperating with hinge means on each end of said gate to provide a pivotal axis therefor, a torsion bar mounted interiorly of said gate having one end secured to said gate interior adjacent one end thereof and having its longitudinal axis extending longitudinally of but offset from the pivotal axis of said gate, bearing means on said gate interior adjacent the bar other end with said bar other end rotatably mounted in and extending through said bearing means, a flange on the side portion of said vehicle adjacent the other end of said gate, cam means on said flange, said bar having the other end thereof projecting through the adjacent gate end portion and being curved into a crank shape to provide a cam following portion adapted to movably engage said cam means upon pivoting of said gate from a predetermined partially opened position at which said bar is in a non-stressed condition to the limiting fully opened and fully closed positions wherein the bar will be stressed so as to tend to move the gate to said partially open position, said cam means being so shaped as to shorten the effective torsion bar crank moment arm as the gate is pivoted about its axis from said partially opened position.

2. In an automotive vehicle body tailgate mounting as set forth in claim 1 wherein the cam means is a slotted cam formation on the adjacent body side portion.

3. In an automotive vehicle body tailgate mounting as set forth in claim 2 wherein the torsion bar cam following portion carries a bearing that rollingly engages the slotted cam formation in the adjacent body side portion.

References Cited in the file of this patent

UNITED STATES PATENTS

| | | |
|---|---|---|
| 2,553,457 | Ingram | May 15, 1951 |
| 2,610,083 | Keller | Sept. 9, 1952 |
| 2,796,287 | Moyes | June 18, 1957 |
| 2,797,434 | Vigmostad | July 2, 1957 |
| 2,810,153 | Semar | Oct. 22, 1957 |
| 2,821,942 | Goodwin | Feb. 4, 1958 |
| 2,871,505 | Clark et al. | Feb. 3, 1959 |

FOREIGN PATENTS

| | | |
|---|---|---|
| 704,399 | Great Britain | Feb. 24, 1954 |